US006982822B2

(12) United States Patent
Teich et al.

(10) Patent No.: US 6,982,822 B2
(45) Date of Patent: Jan. 3, 2006

(54) HIGH-FLUX ENTANGLED PHOTON GENERATION VIA PARAMETRIC PROCESSES IN A LASER CAVITY

(75) Inventors: Malvin C. Teich, Boston, MA (US); Bahaa E. A. Saleh, Lexington, MA (US); Alexander V. Sergienko, Boston, MA (US); John T. Fourkas, Brookline, MA (US); Ralf Wolleschensky, Schoeten (DE); Michael Kempe, Kunitz (DE); Mark C. Booth, Cambridge, MA (US)

(73) Assignees: Trustees of Boston University, Boston, MA (US); The Trustees of Boston College, Chesnut Hill, MA (US); Carl Zeiss Jena GmbH, (DE)

( * ) Notice: Subject to any disclaimer, the term of this patent is extended or adjusted under 35 U.S.C. 154(b) by 122 days.

(21) Appl. No.: 10/443,262

(22) Filed: May 22, 2003

(65) Prior Publication Data

US 2004/0042513 A1    Mar. 4, 2004

Related U.S. Application Data

(63) Continuation of application No. PCT/US01/44889, filed on Nov. 30, 2001.

(60) Provisional application No. 60/250,175, filed on Nov. 30, 2000.

(51) Int. Cl.
*G02F 1/39* (2006.01)
*G02F 1/37* (2006.01)
(52) U.S. Cl. ...................................... 359/330; 359/328
(58) Field of Classification Search ......... 359/326–332
See application file for complete search history.

(56) References Cited

U.S. PATENT DOCUMENTS

| 5,619,517 | A | | 4/1997 | Dixon | 372/21 |
| 5,796,477 | A | * | 8/1998 | Teich et al. | 356/318 |
| 6,057,541 | A | * | 5/2000 | Steenblik | 250/225 |
| 6,252,665 | B1 | * | 6/2001 | Williams et al. | 356/450 |
| 6,473,719 | B1 | * | 10/2002 | Steenblik | 702/181 |
| 2002/0093632 | A1 | * | 7/2002 | Teich et al. | 355/18 |

OTHER PUBLICATIONS

Kryuchkyan et al, "Three-Photon Parametric Oscillator: Semiclassical and Quantum Signatures", Conference Digest of 2000 International Quantum Electronics Conference, Sep. 10-15, 2000, p. 242.*

"Realization of the Einstein-Podolsky-Rosen Paradox for Continuous Variables," Ou et al. *Physical Review Letters.* Jun. 1992. vol. 68, No. 25, pp. 3663-3666.

(Continued)

*Primary Examiner*—John D. Lee
(74) *Attorney, Agent, or Firm*—Gauthier & Connors LLP (57) ABSTRACT

An apparatus for generating a strong source of doubly or multiply entangled photons emitted non-collinearly or collinearly with respect to the pump light that is at frequency 2f includes a laser medium producing classical laser light at fundamental frequency f. A medium for second harmonic generation transforms the light at fundamental frequency f to its second-harmonic frequency 2f and emitting entangled photons non-colinearly with respect to the light at the second harmonic frequency. An optical cavity element around the laser medium and the medium for second harmonic generation includes of at least two mirrors that are highly reflective at the light frequencies f and 2f. A parametric process or a set of simultaneous parametric processes are used to generate the entangled photons at light frequencies around including at least one optical cavity resonant at frequency 2f at least around the medium for entangled photon generation, comprising of at least two mirrors that are highly reflective at the light frequency 2f.

18 Claims, 8 Drawing Sheets

OTHER PUBLICATIONS

"Competing Nonlinearities," Marte. *Rapid Communications, Physical Review A*. May 1994. vol. 49, No. 5, pp. R3166-R3170.

"New High-Intensity Source of Polarization-Entangled Photon Pairs," Kwiat et al. *Physical Review Letters*. Dec. 1995. vol. 75, No. 24, pp. 4337-4342.

* cited by examiner

HIGH-FLUX ENTANGLED PHOTON GENERATION VIA PARAMETRIC PROCESSES IN A LASER CAVITY

PRIORITY INFORMATION

This application is a continuation of International Application No. PCT/US01/44889 filed Nov. 30, 2001, which claims priority from U.S. Provisional application Ser. No. 60/250,175 filed Nov. 30, 2000, both of which are incorporated herein by reference in their entireties.

BACKGROUND OF THE INVENTION

We propose a new technique for the generation of entangled-photon beams with high flux by the use of a parametric process, or simultaneous parametric processes, in conjunction with simultaneous laser action from an active medium and higher-harmonic generation in an optical cavity. Laser action can arise via the usual mechanisms associated with a pumped active medium in a cavity or, more generally, by any number of optical processes such as stimulated emission without population inversion. The production of high-flux entangled-photon beams can be achieved by the presence of such an active medium coupled with, or congruent with, various nonlinear media or devices that permit some combination of parametric processes that generate light at new frequencies, both higher and lower than the laser light within the cavity. The generation of such radiation can be continuous wave (cw), or it can be generated in pulsed form by virtue of processes such as gain switching, cavity dumping, Q-switching, mode-locking, combinations thereof, or other means. It can be implemented in a variety of ways, including second- and optical higher-harmonic generation, and so-called type-I or type-II parametric downconversion.

This invention provides a substantial improvement over the current and established process of spontaneous parametric downconversion, which takes place outside a cavity and produces only a low flux of entangled photon pairs. It is to be distinguished from the well-known processes of optical parametric amplification and optical parametric oscillation that take place in a cavity that contains the two modes of the downconverted light. In these latter processes the two members of an entangled photon-pair (twin photons) are emitted from the cavity individually thereby lengthening the entanglement time and diluting the entangled nature of the emitted photon pairs or clusters. In the technique proposed herein, the entangled-photon pairs maintain their close coordination in time, space, momentum, energy, and/or polarization after exiting from the device.

Ideal spontaneous parametric downconversion splits each pump-beam photon into twin daughter photons that are emitted simultaneously. Since energy and momentum are conserved in the splitting process, the daughter photons share the energy and momentum of the mother. This entangles the directions of the two daughters so that the emission of one photon in a given direction is associated with a certain simultaneous emission of a twin photon in a matching direction. The twins may have the same frequency (wavelength or color), in which case they are identical (or degenerate); or differ in frequency (wavelength or color), in which case they are in a sense fraternal (or nondegenerate). The downconverted pairs generated may emerge in the same direction (colinearly) or in different directions (non-colinearly). The twins may also be entangled in polarization for type-II downconversion. The entanglement persists no matter how far away the photons might be from each other.

In one implementation of the invention, the technique can be used for the generation of entangled photons using simultaneous parametric processes such as second-harmonic generation and spontaneous parametric downconversion in conjunction with laser action in a cavity. The parametric processes can be engendered by making use of a single nonlinear device such as a nonlinear optical crystal that produces both second-harmonic generation and parametric downconversion, or separate nonlinear devices, within the cavity. The high energy density within the cavity allows entangled photons with high flux to be produced in such directions that they exit from the cavity after they are generated. This technique is particularly applicable for non-colinear generation.

In another implementation of the invention, multiple laser cavities are used in conjunction with mirrors that have high reflectance at one wavelength and low reflectance at another wavelength, together with dichroic and/or polarization-sensitive optics and multiple intracavity nonlinear crystals, to achieve strong pumping of the nonlinear parametric downconversion process and high-flux entangled photons to be generated and exit the optical system. This technique is particularly applicable for colinear generation.

In another implementation of the invention, multiple laser cavities may be used in conjunction with mirrors that have high reflectance at one frequency and low reflectance at another frequency, together with an optical element or optical elements that angularly separate the different light frequencies. Examples of such elements are dichroic, prism, and/or grating devices and/or polarization-sensitive optics. Multiple intracavity nonlinear optical crystals may also be used to achieve strong pumping of the nonlinear parametric downconversion process and thereby permit high-flux entangled photons to be generated and exit the optical system. This technique is particularly applicable for colinear generation.

BRIEF DESCRIPTION OF THE DRAWINGS

FIG. 5 is a diagram of one implementation of high-flux entangled-photon generation via parametric processes in a laser cavity. The downconverted beams (indicated as wiggly) have center frequencies f in the degenerate case. The downconverted light emerges at oblique angles, as indicated by the arrows and is thereby separated from the laser light at frequency f (indicated as cross-hatched) and from the second-harmonic (SH) light at 2f (indicated as dark gray). The cavity mirrors have high reflectance (HR) at f and at 2f. The frequency f corresponds to the wavelength $\lambda_{pump}$ while the frequency 2f corresponds to the wavelength $\lambda_{pump}/2$. The entangled-photon pairs may be degenerate or nondegenerate, colinear or noncolinear, and may be generated via type-I or type-II optical parametric downconversion.

FIG. 6 is a diagram illustrating another implementation for high-flux entangled-photon generation via parametric processes, using multiple optical cavities, an active laser medium, an intracavity nonlinear-optical second-harmonic generation (SHG) crystal, an intracavity parametric downconversion (PDC) crystal, and dichroic (and/or polarization sensitive) optics that are of high reflectance (HR) or high transmittance (HT) at the frequencies f and/or 2f, as indicated. The colinear downconverted beams (indicated as wiggly) have center frequencies f in the degenerate case. The laser light (indicated as cross-hatched) has frequency f (wavelength $\lambda_{pump}$) and the second-harmonic light (indicated as dark gray) has frequency 2f (wavelength $\lambda_{pump}/2$). The entangled-photon pairs may be degenerate or nondegenerate, colinear or noncolinear, and may be generated via type-I or type-II optical parametric downconversion.

DETAILED DESCRIPTION OF THE PREFERRED EMBODIMENTS

Figure 1:
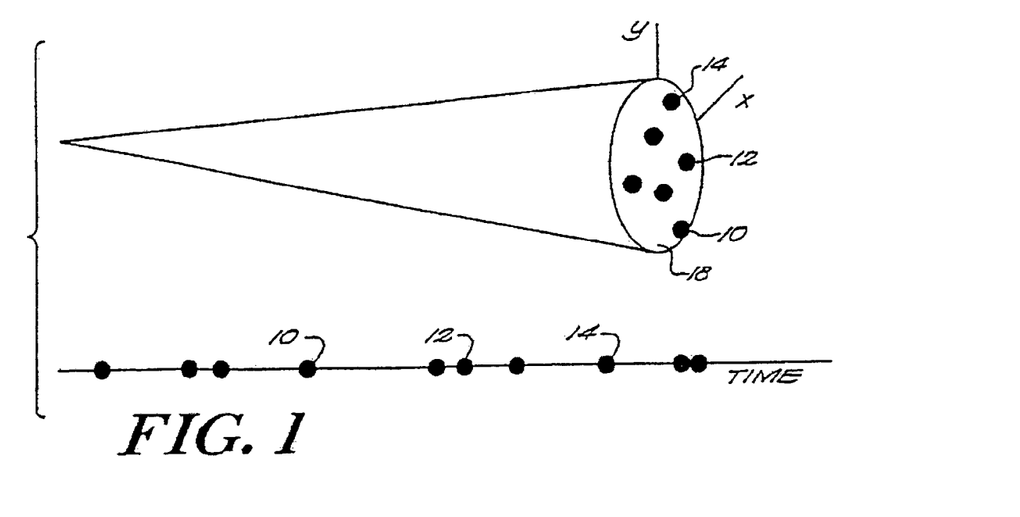
FIG. 1 is a diagram illustrating photon arrivals from a classical light source.

As shown in FIG. 1, classical photons arrive randomly and independently. The photons arrive in time in Poisson fashion, as illustrated on the time line by photons 10, 12, and 14. The photons arrive in space in uniformly distributed fashion, as illustrated by photons 10, 12, and 14 at the plane 18. The probability of arrival of one photon in time $\tau$ and area $\sigma$, when the incident photon-flux density is $\phi$ (photons/sec-m$^2$), equals $\phi\sigma\tau$.

Figure 2:
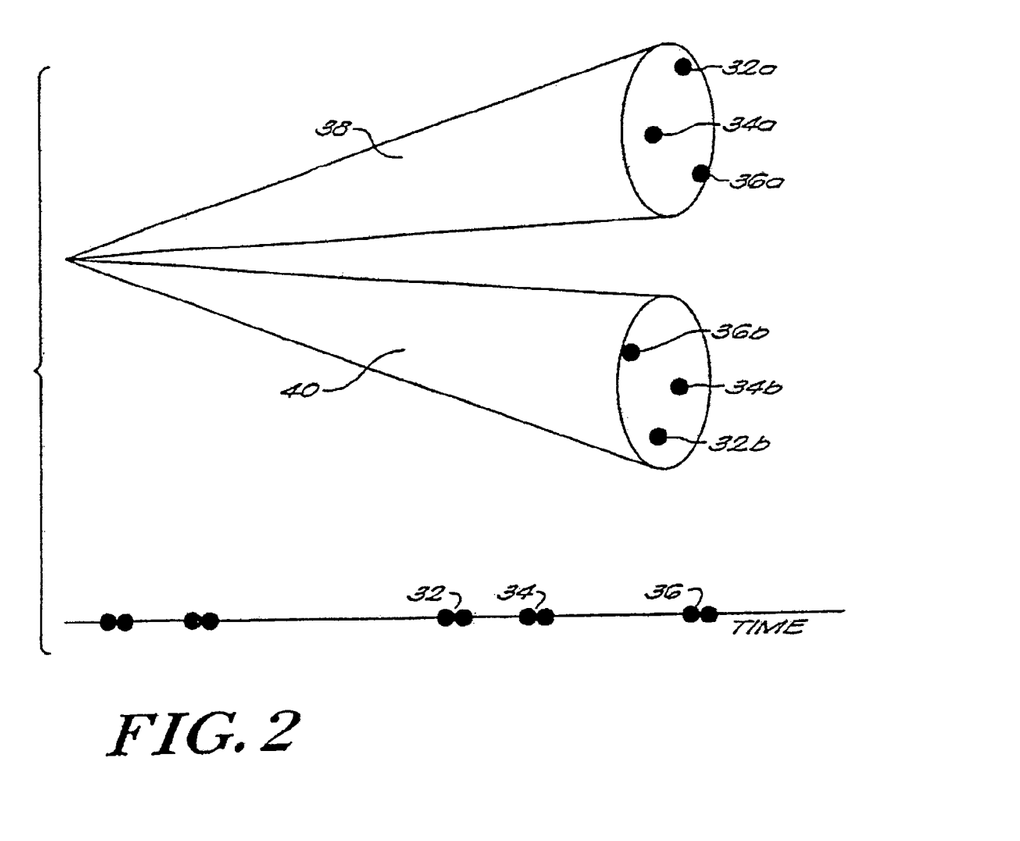
FIG. 2 is a diagram illustrating photon arrivals in distinct spatial directions from an ideal entangled light source.

As shown in FIG. 2, photons of an ideal entangled light source arrive in perfect pairs. The two photons of a pair arrive simultaneously, as illustrated on the time line by photon pairs 32, 34, and 36. The two photons of a pair also arrive at matched positions, as illustrated by photons 32a and 32b, 34a and 34b, and 36a and 36b for the noncolinear case. Each photon-arrival position in the first beam 38 has one and only one corresponding matched photon-arrival position in the second beam 40.

Figure 3:
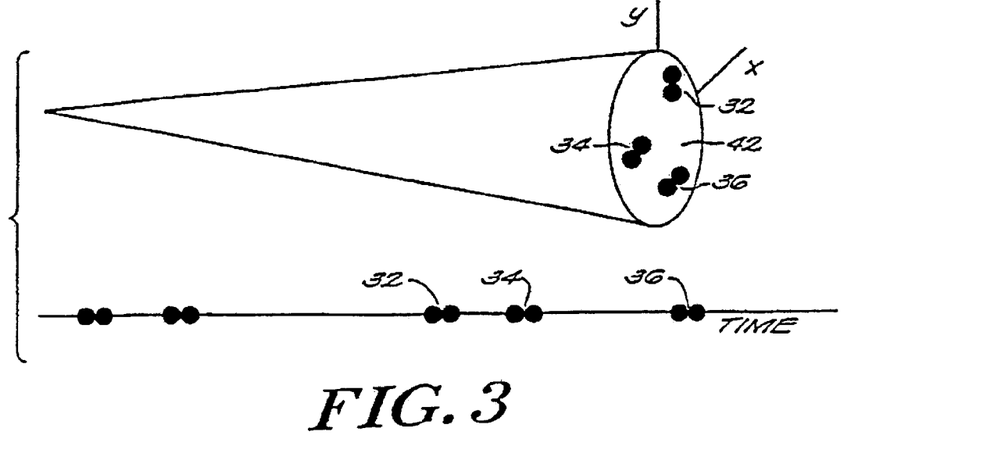
FIG. 3 is a diagram illustrating photon arrivals from an ideal entangled light source using an imaging system.

As shown in FIG. 3, an imaging system can be used to bring the matching photon pairs together at a target plane 42 so that they arrive simultaneously at the same position. Photon pairs 32, 34, and 36 are matched in time, as illustrated on the time line, and are also matched in spatial location, as illustrated in the target plane 42.

Figure 4:
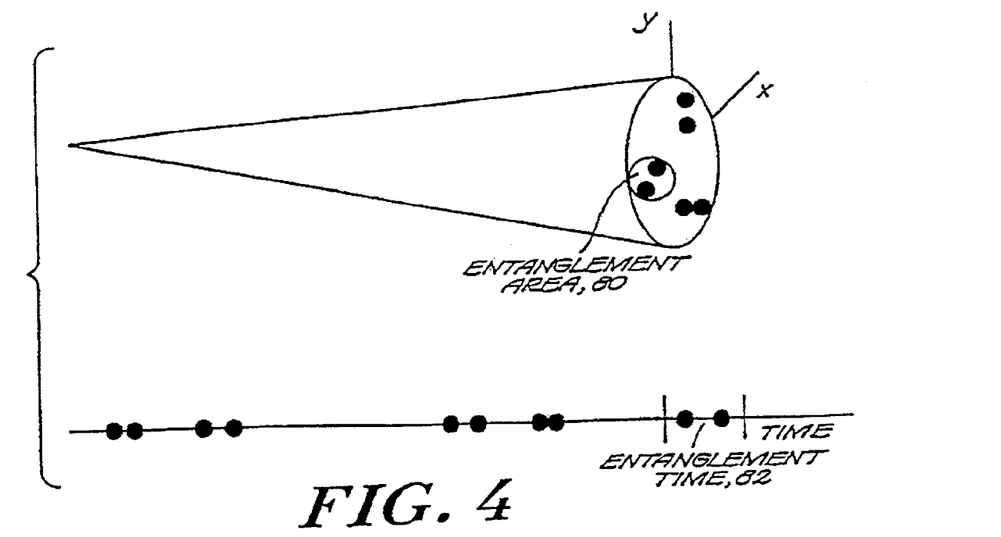
FIG. 4 is a diagram illustrating photon arrivals from a real (non-ideal) entangled light source with a finite entanglement area and finite entanglement time.

If a real source of quantum-mechanically entangled photons is used (rather than the ideal one considered immediately above), the photon-pair occurrence times are highly correlated rather than identical. Such entangled-photons may be generated, for example, by type-I or type-II spontaneous parametric downconversion. Because energy is conserved in the entangled-pair creation process, the twin photons are produced nearly simultaneously and each has a wavelength longer than the original. Momentum is also conserved, resulting in a nearly one-to-one correspondence between the directions of travel of each photon in an entangled pair. Because they share the energy and momentum of the original photon, the twin photons are said to be "entangled" with each other. In type-II downconversion the polarization properties of the photons also bear a special relationship to each other. For such a real source of entangled-photon pairs, as shown in FIG. 4, the two photons of each pair arrive at random positions within a small area $A_e$, called the entanglement area 80. The two photons also arrive randomly within a small time interval $T_e$, called the entanglement time 82. The spatial resolution of the system is dependent on, among other things, the entanglement angle. The entanglement angle is the angular width of the cone of directions entangled with a particular single direction of its twin photon. A number of factors influence the size of the entanglement angle, including the spectral width and beam width of the laser, as well as the interaction volume of the nonlinear optical medium. The temporal resolution of the system is dependent on, among other things, the entanglement time. Pump-beam characteristics such as the spectral width and beam width, and nonlinear material characteristics such as the crystal length and orientation, can be adjusted to generate entangled photons with adjustable entanglement time. Both the entanglement angle and the entanglement time can be adjusted as required for the application. This is called entanglement-angle and entanglement-time tuning.

Figure 5:
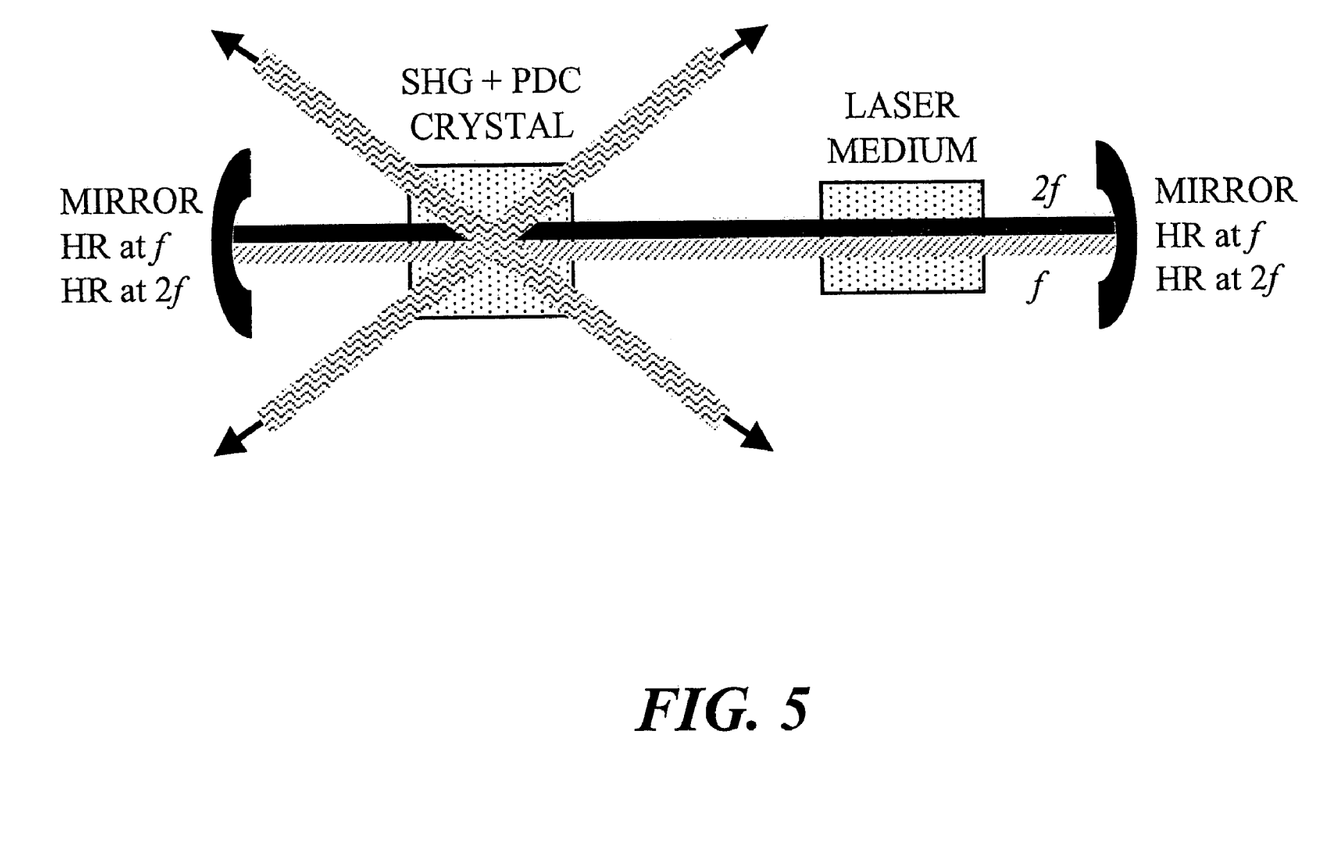

The present invention relates to the generation of high-flux entangled-photon pairs. As shown in FIG. 5, in one configuration we envision the mirrors associated with the laser cavity to have very high reflectance, even as high as 100%, at both the fundamental laser frequency f and at the second-harmonic generation frequency 2f. The laser medium may be a crystal, semiconductor, liquid, gas, or other similar source of stimulated or spontaneous emission. The laser pump (not shown) and lasing process may be continuous-wave or pulsed. The light preferably has energy in the frequency range from radiowaves to x-rays. A nonlinear material or device within the laser cavity converts some fraction of the laser fundamental frequency into its second harmonic. A nonlinear material or device within the laser cavity, which may, but need not necessarily, be the same nonlinear material or device that generates the second harmonic radiation in the first place, is simultaneously used to generate radiation via spontaneous parametric downconversion of the second-harmonic radiation. The light generated by means of spontaneous parametric downconversion may be produced by a type-I or type-II parametric interaction. The nonlinear optical media may be crystals or other materials, surfaces, interfaces or other similar components. One function of the nonlinear optical medium is to cause a portion of the pump beam to split into a signal beam and an idler beam (referred to collectively as twin beams or entangled photons or two-mode squeezed-state photons), contributing a stream of daughter signal entangled photons and a corresponding stream of daughter idler entangled photons. In the noncolinear case these entangled-photon beams exit from nonlinear-optical crystal at appropriate angles in accordance with the phase-matching condition, which causes them to be separated from the laser and second-harmonic beams and therefore not to be contaminated by residues thereof.

Figure 6:
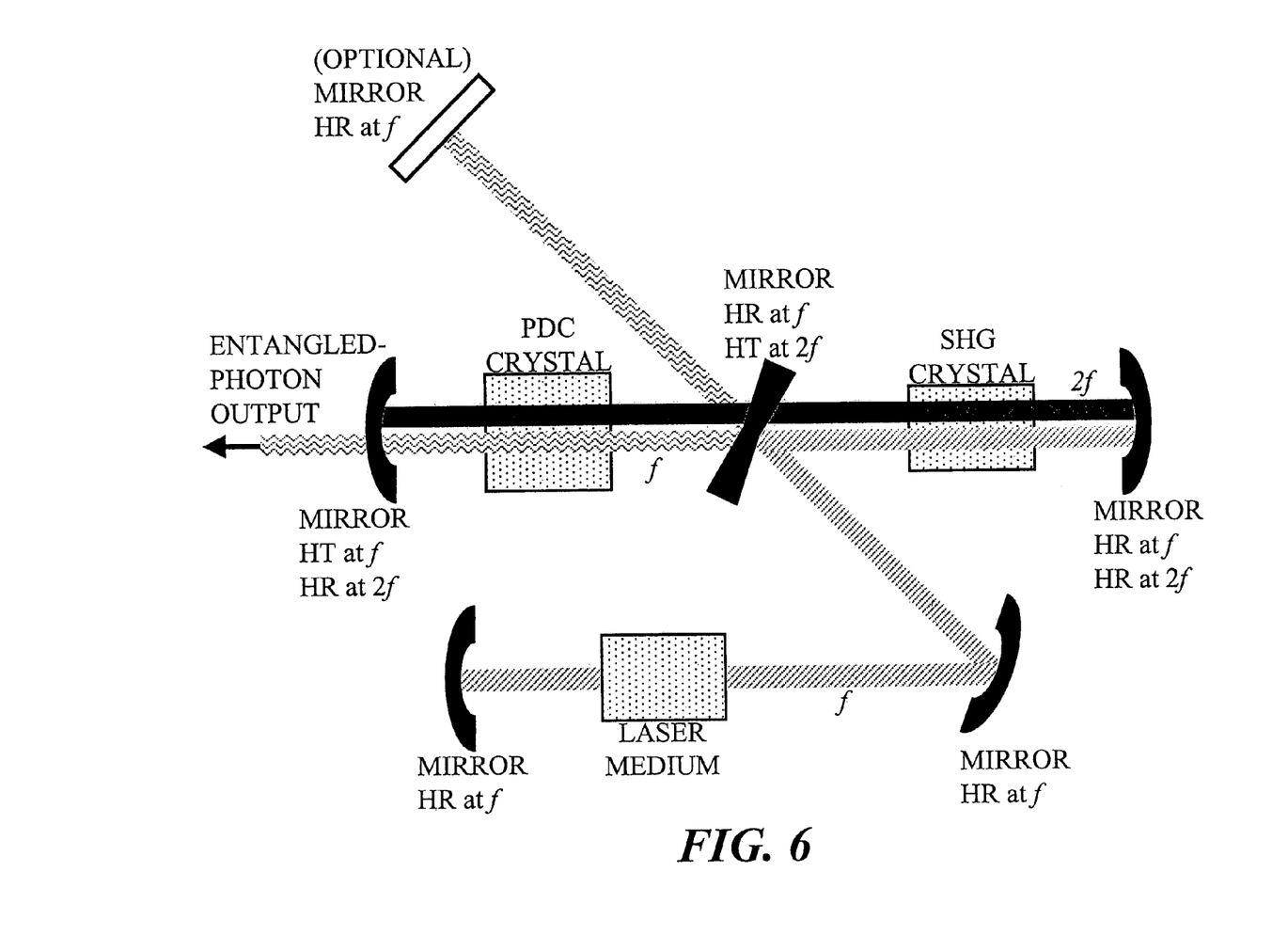

In another embodiment of the invention, shown in FIG. 6, multiple optical cavities are used in conjunction with multiple intracavity nonlinear crystals (such as SHG and PDC), together with an active laser medium (LASER MEDIUM). The laser medium may be a crystal, semiconductor, liquid, gas, or other similar source of stimulated or spontaneous emission. The laser pump (not shown) and lasing process may be continuous-wave or pulsed. The light preferably has energy in the frequency range from radiowaves to x-rays. Dichroic mirrors and other optics are specifically designed to have high reflectance (HR) and/or high transmittance (HT) at f and/or 2f. This permits strong lasing action to be achieved at the frequency f in a backwards-Z-shaped cavity (cross-hatched beam), simultaneously with strong intracavity second-harmonic generation at the frequency 2f in a —-shaped cavity (dark gray beam), simultaneously with spontaneous parametric downconversion with nominal center frequency f without the presence of any cavity if the optional mirror in the figure is not included (wiggly beams). The entangled photons spontaneously generated thereby exit via a mirror with HR at 2f and HT at f. If desired, an optional mirror with HR at f can be used to create an additional backwards-∠-shaped cavity for the entangled photons, thereby permitting stimulated parametric downconversion to occur, should it be desired to modify the entanglement time and/or entanglement area for particular applications. The entangled-photon pairs may be degenerate or nondegenerate, colinear or noncolinear, and may be generated via type-I or type-II optical parametric downconversion.

As a specific example of an implementation of the arrangement indicated in FIG. 6, the laser medium may be neodymium doped yttrium-aluminum garnet (YAG) (or yttrium vanadate or other similar active medium), which gives rise to laser oscillation at a wavelength near 1.06 micrometer in the near-infrared, but this is to be understood more generally as occurring an arbitrary wavelength $\lambda_{pump}$ (frequency f). This radiation leads to intracavity second-harmonic generation (SHG) in a crystal such as β-barium borate (BBO) or other nonlinear optical medium at a wavelength near 0.53 micrometer in the green, but this is to be understood more generally as occurring at an arbitrary wavelength $\lambda_{pump}/2$ (frequency 2f), which is the second-harmonic frequency of the aforementioned laser light which is itself of arbitrary frequency. This second-harmonic light, in turn, produces strong parametric downconversion (PDC) in a crystal such as β-barium borate (BBO) or other nonlinear optical medium at a wavelength near 1.06 micrometer in the near-infrared, but this is to be understood more generally as occurring an arbitrary wavelength near $\lambda_{pump}$ (frequency f), which is the same as the wavelength of the aforementioned laser light, which is itself arbitrary.

Figure 7:
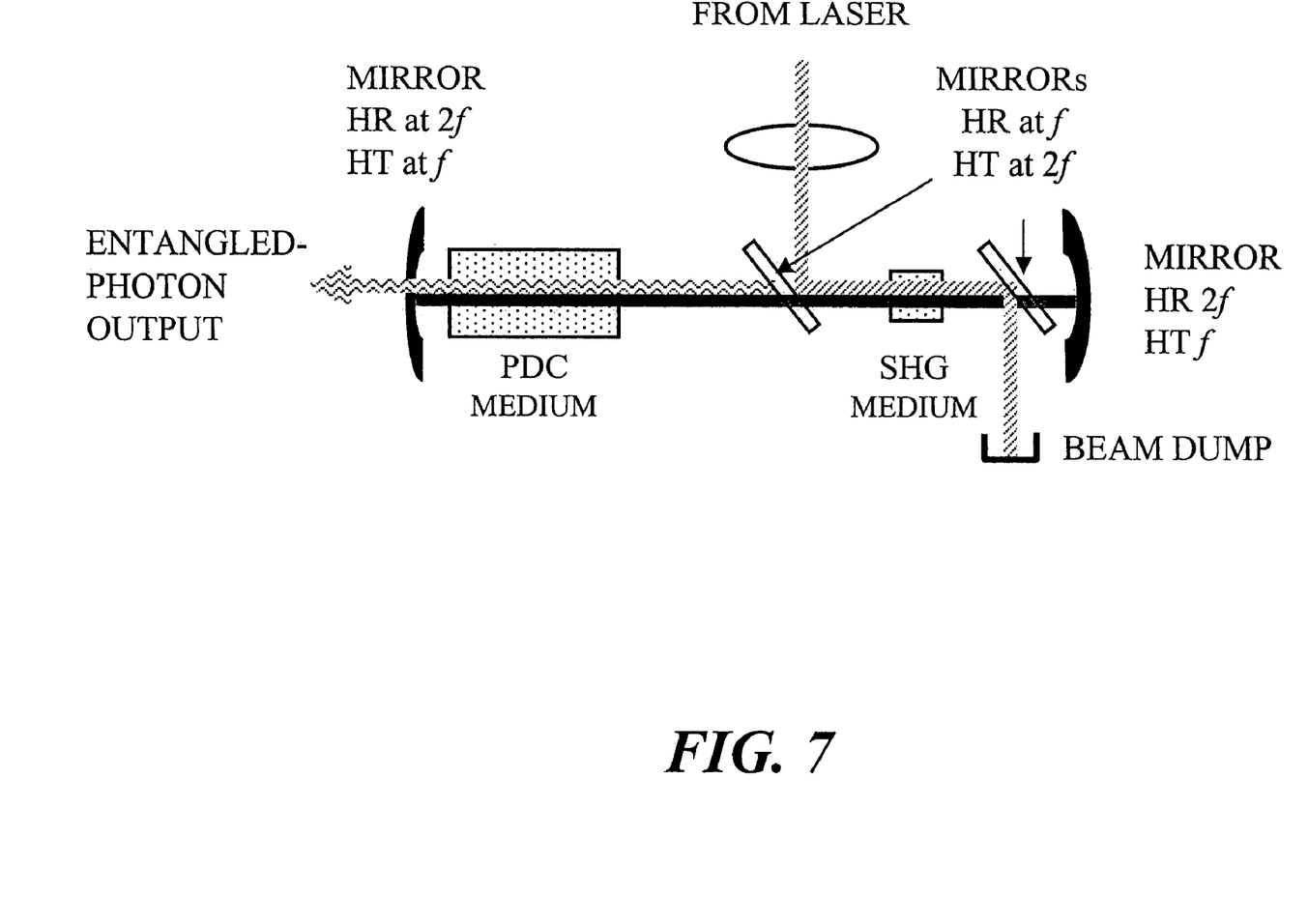
FIG. 7 is a diagram illustrating an embodiment similar to the one shown in FIG. 6. However, in this case the laser cavity (not shown) is not part of the arrangement itself. The second harmonic (SH) light circulating within the cavity is therefore generated outside the laser cavity.

In a modification of the arrangement shown in FIG. 6, the crystal for SHG is not part of the laser cavity of the pump laser. Even in this case, efficient SHG can be achieved if the pump laser is pulsed with a high peak intensity and/or if the material for SHG is particularly efficient. The latter is, for instance, the case with poled materials and, in particular, such materials within waveguiding structures. FIG. 7 shows such an embodiment where several dichroic mirrors are employed to achieve a strong separation of the pump light at frequency f and the entangled photons which, in the degenerate case, exhibit the same frequency f. In order to achieve high efficiency of parametric downconversion, it is crucial to minimize the losses for the SH light that circulates inside the cavity formed by the HR mirrors. If the roundtrip losses in this cavity are $L=1-(\Pi T_i)^2$ where $T_i$ is the transmission through the $i^{th}$ element within the cavity, the enhancement of the entangled-photon generation, in comparison to a single-pass situation outside the cavity, is $1/L$. In addition to a proper choice of materials and high-quality surfaces with suitable coatings, it is also desirable to minimize the number of elements within the cavity.

Figure 8:
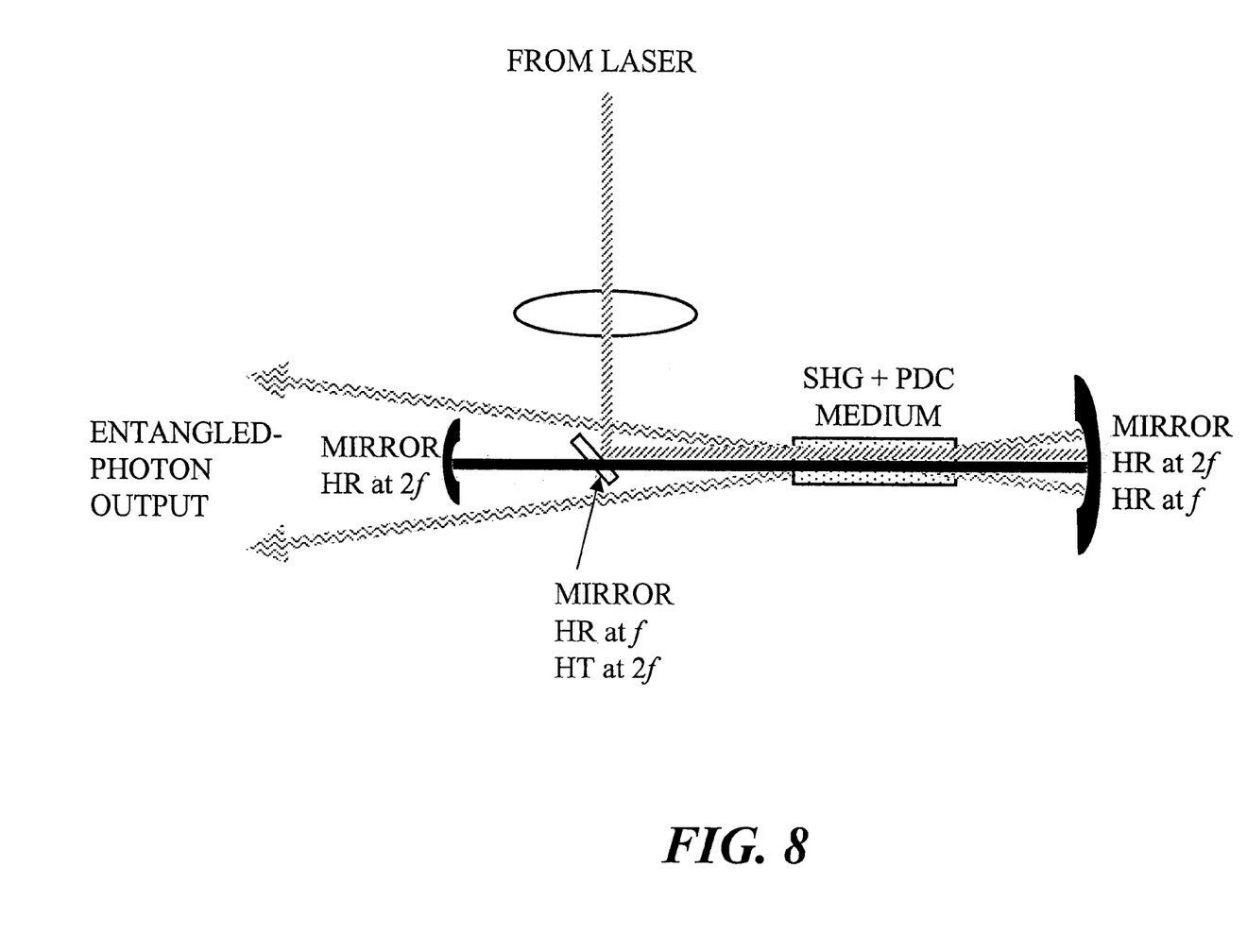
FIG. 8 is a diagram illustrating yet another arrangement for high-flux entangled-photon generation via parametric processes. Here the SHG and the PDC occur in the same nonlinear medium and the entangled photons leave the cavity due to their noncolinear generation or due to the higher divergence of PDC light in comparison with SH light, if it is generated within a waveguiding structure.

FIG. 8 shows an optimized configuration where the SHG and PDC processes occur in the same nonlinear medium. For the SHG, high intensities are required that can, for instance, be maximized by strong focussing. On the other hand, for the generation of entangled photons via parametric downconversion, a long interaction length is desirable. Therefore, in the arrangement shown in FIG. 8, the use of poled nonlinear materials within waveguiding structures (slab waveguides or fibers) is particularly advantageous. Since the downconverted light has a lower frequency than the SH light, it exhibits a higher divergence outside the waveguiding structure and exits the cavity toward the left of the figure. Entangled photons leaving the nonlinear medium toward the right are backreflected into the medium via the right cavity mirror and can serve as seed photons that further enhance parametric downconversion. A further reduction of the number of elements, which is beneficial, is possible if the HR mirror on the right side is combined with the nonlinear medium. For instance the mirror could be directly coated on the right side of a waveguiding structure.

Figure 9:
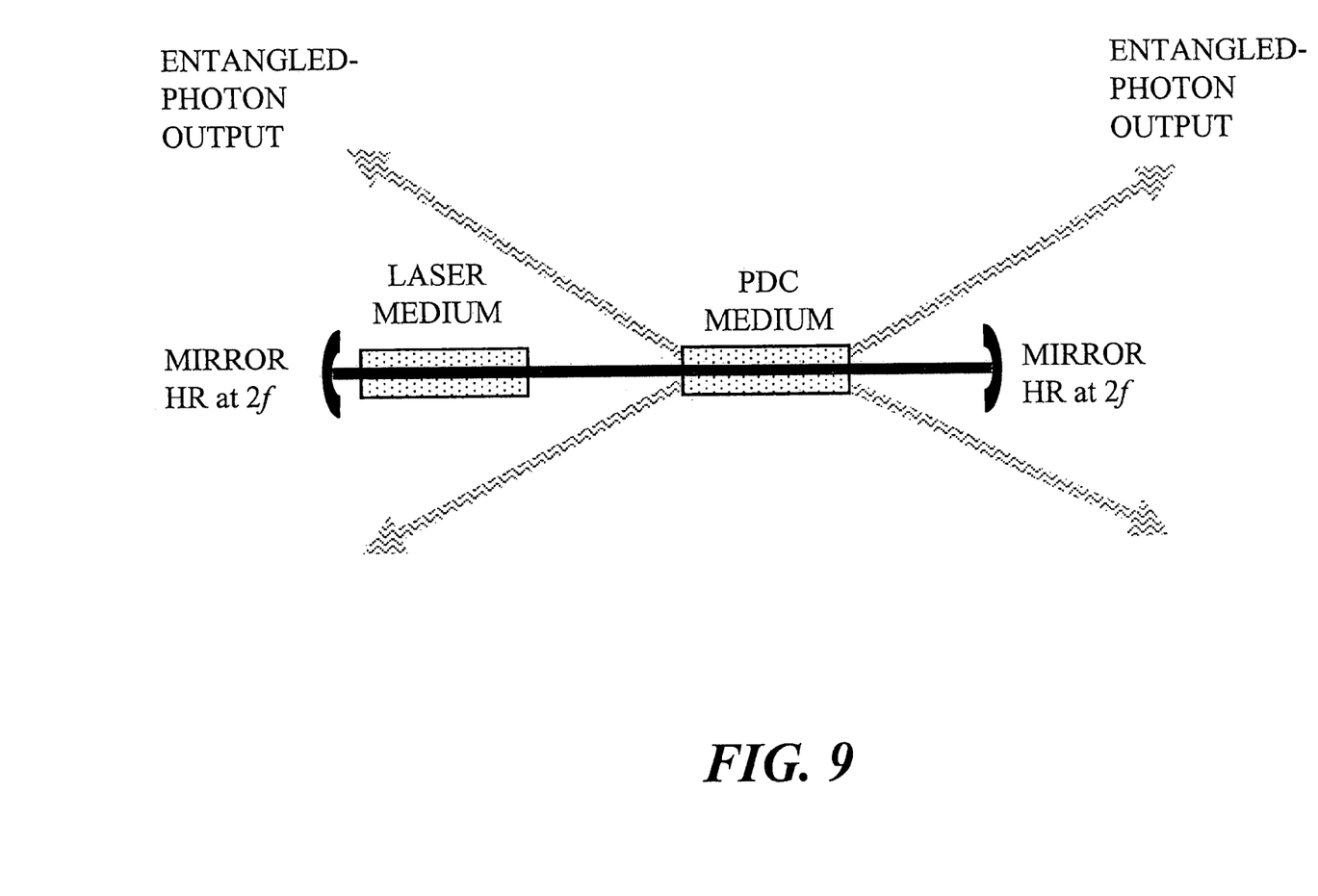
FIG. 9 is a diagram illustrating an embodiment similar to the one shown in FIG. 5. In this case, however, no SHG is required as the laser light is generated directly at a frequency 2f within the cavity. The light at frequency 2f pumps the PDC medium to generate non-colinear entangled photons at frequency f.

FIG. 9 is a diagram illustrating an embodiment similar to the one shown in FIG. 5. In this case, the laser cavity is producing laser light at frequency 2f. The light at frequency 2f is circulating within the cavity and pumping the PDC medium to generate non-colinear entangled photons at frequency f. The entangled photons leave the cavity as they are generated at oblique angles with respect to the pump beam.

Figure 10:
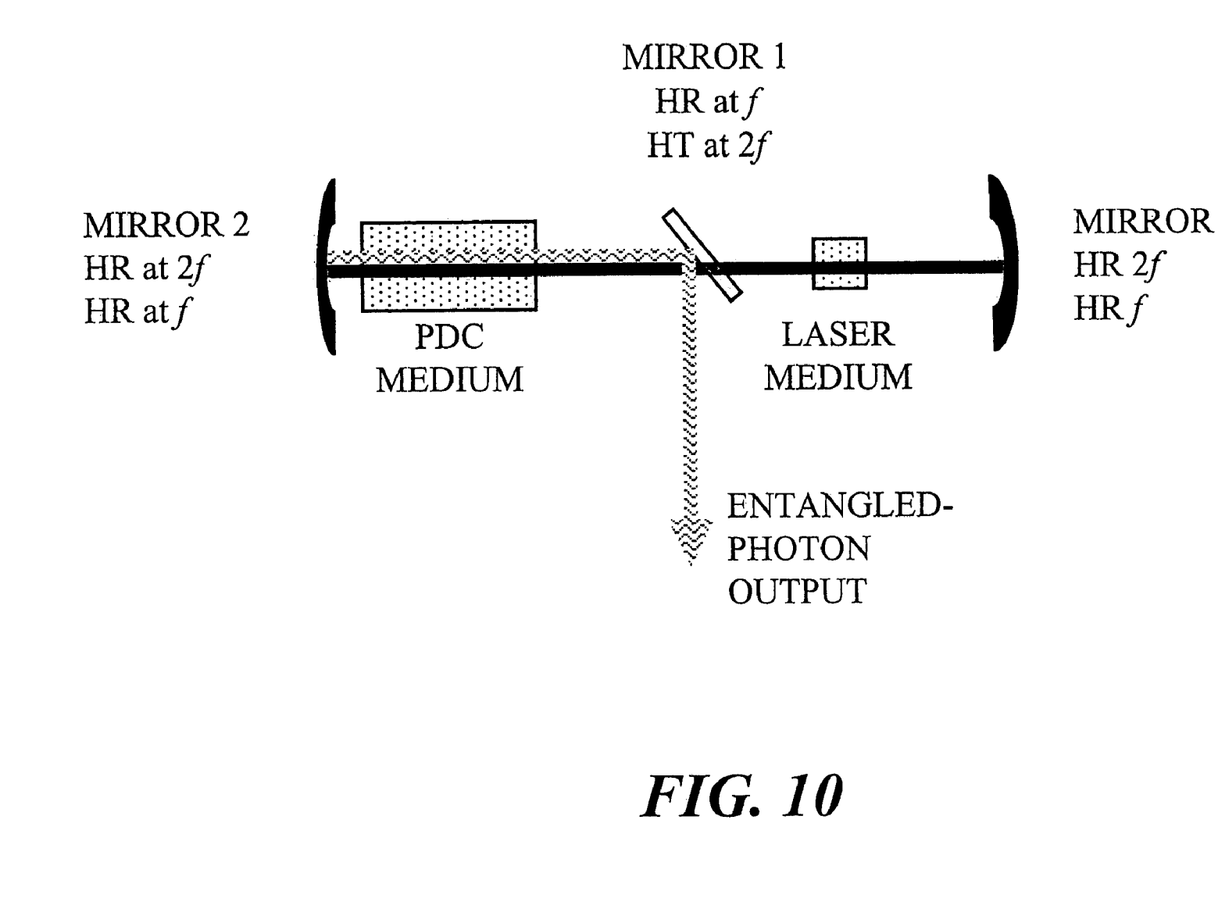
FIG. 10 is a diagram illustrating yet another arrangement for high-flux entangled-photon generation via parametric processes similar to the one shown in FIG. 7. Here the SHG crystal has been replaced by a laser medium generating light at frequency 2f. The light at frequency 2f directly pumps the PDC medium to generate colinear entangled photons at a frequency f.

FIG. 10 is a diagram illustrating yet another arrangement for high-flux entangled-photon generation via parametric processes similar to the one shown in FIG. 7. Here the SHG crystal has been replaced by a laser medium generating light at frequency 2f. The light at frequency 2f directly pumps the PDC medium to generate colinear entangled photons at frequency f. MIRROR 1 is required to couple the entangled photons out of the cavity. In another embodiment (not shown), MIRROR 1 is removed and the PDC light is coupled out of the cavity via MIRROR 2 that is, in this case, highly transmissive for frequency f.

In other embodiments of the present invention, the entangled-photons are generated by processes other than type-I spontaneous parametric downconversion. For example, the photons may be generated by type-II spontaneous parametric downconversion, in which the photons are emitted in the same (or in separate directions) but with different polarizations. Polarization-sensitive optics (such as polarizing beamsplitters) may be used in conjunction with, or in place of, dichroic optics in configurations like that depicted in FIG. 6, depending on the form of downconverted twin pairs desired.

In other embodiments of the invention, the photons may be generated by spontaneous parametric downconversion in poled or unpoled optical fibers or materials, or at a surface or an interface, or directly at the source or surface of the device producing the pump beam. The photons may be generated not only by spontaneous parametric downconversion but also by stimulated parametric downconversion or by cascaded atomic emissions. With cascaded atomic emissions, a pump beam is incident on a material that emits a cascade of two photons, entangled via energy and momentum conservation.

In another embodiment of the invention, one or more pulsed or continuous-wave auxiliary (or control) light beams are injected into the system at one or more frequencies, directions, polarizations, or combinations thereof, such that one or more of the constituent processes (for example laser action, second-harmonic generation, and or parametric downconversion) is seeded, i.e., induced to occur preferentially in a chosen manner. This may further enhance the generation of high-flux entangled-photon pairs. The sources of the control light beams may be laser or fluorescence light arising from intracavity interactions or by an externally supplied source of light. This control light serves to couple the initial, intermediate, and/or final states of the laser medium and nonlinear optical materials to other states, thereby enhancing the entangled-photon generation rate. Alternatively, this control light serves as a pump to provide high occupancy of a particular energy level, thereby maintaining the material in a state of readiness to generate entangled-photon pairs.

Such auxiliary pulsed or continuous-wave light beams may also be used to serve as an adjunct to the beams of entangled-photon pairs, in order to provide a light source that consists of entangled-photon pairs in part and classical photons in part. This combination of quantum and classical light may be particularly useful for certain applications. One example could be when it is desired to achieve three-photon absorption.

In other embodiments of the present invention, laser action coupled with nonlinear optical processes and dichroic (and/or polarization-sensitive) optics in optical cavities are used to generate multiply entangled photons (three, four, and more) that may travel in two or more distinct spatial directions. Triples and quadruples of entangled photons may be obtained from a higher-order downconverter, from a cascade of two-photon downconverters, or from atomic cascades (for example, an atom cascading through two intermediate levels to produce three entangled photons).

In yet another implementation of the invention, a pump beam consisting of multiple wavelengths (derived, for example, from the superposition of multiple simultaneously oscillating laser lines) is used to simultaneously excite a number of nonlinear crystals in a number of optical cavities or in a single broadband cavity.

Another embodiment of the present invention incorporates interferometers of various types, both inside of and/or outside of, the optical cavities to enhance the generation of high-flux entangled-photon pairs.

For nonmonochromatic and pulsed entangled-photon pairs, dispersive broadening can be nonlocally canceled by proper choice of optical materials as a result of anticorrelations in the frequency components of the twin photons, engendered by energy conservation. In the case where the twin photons travel through materials having dispersion coefficients approximately equal in magnitude and opposite in sign, for example, the photon arrivals will remain coincident. The present invention can therefore accommodate the use of optical fibers for the transport and processing of light.

Although only the generation of high-flux entangled photons has been described, the present invention may also generate pairs of other entities, such as electrons, atoms, molecules, or photons that are correlated in time and/or space but not necessarily entangled.

Parametrically downconverted radiation generated by mechanisms such as those discussed above may be expected to have novel, unusual, and useful properties. For example, the statistical properties of such radiation may reflect the presence of pairs or clusters of photon. Moreover, as a result of the inextricably intertwined generation processes, such radiation can exhibit novel, unusual, and useful entanglement characteristics such as entanglement among photons or groups of photons, among directions or groups of directions, among frequencies or groups of frequencies, among polarizations or groups of polarizations, or any combination thereof. It may therefore be possible to achieve more varieties of hyperentanglement than heretofore possible. As one simple example, evident in FIG. 5, pairs of entangled-photons are emitted both to the left and to the right so that quartets of such photons will exhibit special entanglement and correlation properties with respect to each other.

High-flux entangled-photon beams are expected to find use in a large number of applications including new forms of optical measurements [D. N. Klyshko, "Utilization of vacuum fluctuations as an optical brightness standard," *Sov. J. Quantum Electron.* 7, 591 (1977); A. Migdall, R. Datla, A. V. Sergienko, J. S. Orszak, and Y. H. Shih, "Measuring absolute infrared spectral radiance using correlated visible photons: Technique verification and measurement uncertainty," *Appl. Opt.* 37, 3455 (1998)], new forms of quantum imaging [B. M. Jost, A. V. Sergienko, A. F. Abouraddy, B. E. A. Saleh, and M. C. Teich, "Spatial correlations of spontaneously down-converted photon pairs detected with a single-photon-sensitive CCD camera," *Opt. Express* 3, 81 (1998); B. E. A. Saleh, A. F. Abouraddy, A. V. Sergienko, and M. C. Teich, "Duality between partial coherence and partial entanglement," *Phys. Rev. A* 62, 043816 (2000)] including entangled-photon microscopy and display [M. C. Teich and B. E. A. Saleh, U.S. Pat. No. 5,796,477, issued Aug. 18, 1998], new forms of optical spectroscopy [M. C. Teich and B. E. A. Saleh, U.S. Pat. No. 5,796,477, issued Aug. 18, 1998; B. E. A. Saleh, B. M. Jost, H.-B. Fei, and M. C. Teich, "Entangled-photon virtual-state spectroscopy," *Phys. Rev. Lett.* 80, 3483 (1998); H.-B. Fei, B. M. Jost, S. Popescu, B. E. A. Saleh, and M. C. Teich, "Entanglement-induced two-photon transparency," *Phys. Rev. Lett.* 78, 1679 (1997)], as well as in quantum information [A. K. Ekert, "Quantum cryptography based on Bell Theorem," *Phys. Rev. Lett.* 67, 661 (1991); J. G. Rarity and P. R. Tapster, "Fourth-order interference effects at large distances," *Phys. Rev. A* 45, 2052 (1992); J. Brendel, N. Gisin, W. Tittel, and H. Zbinden, "Pulsed energy-time entangled twin-photon source for quantum communication" *Phys. Rev. Lett.* 82, 2594 (1999); A. V. Sergienko, M. Atatüre, Z. Walton, G. Jaeger, B. E. A. Saleh, and M. C. Teich, "Quantum cryptography using femtosecond-pulsed parametric down-conversion," *Phys. Rev. A* 60, R2622 (1999); C. H. Bennett, G. Brassard, C. Crepeau, R. Jozsa, A. Peres, and W. Wootters, "Teleporting an unknown quantum state via dual classical and Einstein-Podolsky-Rosen channels," *Phys. Rev. Lett.* 70, 1895 (1993); D. Boschi, S. Branca, F. De Martini, L. Hardy, and S. Popescu, "Experimental realization of teleporting an unknown pure quantum state via dual classical and Einstein-Podolsky-Rosen channels," *Phys. Rev. Lett.* 80, 1121 (1998); D. Bouwmeester, J.-W. Pan, K. Mattle, M. Eibl, H. Weinfurter, and A. Zeilinger, "Experimental quantum teleportation," *Nature* 390, 575 (1997)] and in the examination of quantum paradoxes [J. S. Bell, "On the Einstein-Podolsky-Rosen paradox," *Physics* 1, 195 (1964); J. F. Clauser, M. A. Horne, A. Shimony, and R. A. Holt, "Proposed experiment to test local hidden-variable theories," *Phys. Rev. Lett.* 23, 880 (1969); P. G. Kwiat, K. Mattle, H. Weinfurter, A. Zeilinger, A. V. Sergienko, and Y. H. Shih, "New high-intensity source of polarization-entangled photon pairs," Phys. Rev. Lett. 75, 4337 (1995); L. Hardy, "Nonlocality for two particles without inequalities for almost all entangled states," Phys. Rev. Lett. 71, 1665 (1993); A. G. White, D. F. V. James, P. H. Eberhard, and P. G. Kwiat, "Nonmaximally entangled states: production, characterization, and utilization," Phys. Rev. Lett. 83, 3103 (1999); D. M. Greenberger, M. A. Home, and A. Zeilinger, in Bell's Theorem, Quantum Theory, and Conceptions of the Universe, edited by M. Kafatos (Kluwer, Dordrecht, 1989); D. M. Greenberger, M. A. Horne, A. Shimony, and A. Zeilinger, "Bell's theorem without inequalities," Am. J. Phys. 58, 1131 (1990); D. Bouwmeester, J.-W. Pan, M. Daniell, H. Weinfurter, and A. Zeilinger, "Observation of three-photon Greenberger-Home-Zeilinger entanglement," Phys. Rev. Lett. 82, 1345 (1999)], among other applications and uses.

Other embodiments and uses of the invention will be apparent to those skilled in the art from consideration of the specification and practice of the invention disclosed herein. The specification and examples should be considered exemplary only.

What is claimed is:

1. An apparatus for generating a strong source of doubly or multiply entangled photons emitted non-colinearly or colinearly with respect to the pump light that is at frequency 2f comprising:
    a laser medium producing classical laser light at fundamental frequency f;
    a medium for second harmonic generation transforming the light at fundamental frequency f to its second-harmonic frequency 2f and emitting entangled photons non-colinearly with respect to the light at the second harmonic frequency; and
    an optical cavity element around the laser medium and the medium for second harmonic generation comprising of at least two mirrors that are highly reflective at the light frequencies f and 2f;
    wherein a parametric process or a set of simultaneous parametric processes are used to generate the entangled photons at light frequencies around f including at least one optical cavity resonant at frequency 2f at least around the medium for entangled photon generation, comprising of at least two mirrors that are highly reflective at the light frequency 2f.

2. An apparatus according to claim 1, wherein said optical cavity element comprises an optical element that is placed between the laser medium and the medium for second harmonic generation to spatially separate the 2f and f light frequencies, and at least one of said at least two mirrors of this cavity is also highly reflective at light frequency 2f such that a second optical cavity, formed by said mirror and another mirror that is highly reflective at frequency 2f, is resonant at frequency 2f and includes the medium for second harmonic generation, the medium for the generation of entangled photons, and the optical element for spatially separating the light at frequencies 2f and f said second mirror can by highly reflective for frequencies around f, in which case the entangled photons leave the cavity only via the optical element for angularly separating the light at frequencies 2f and f, or said second mirror can be highly transmissive for frequencies around f, in which case the entangled photons can also leave the cavity directly via said second mirror so as to direct all entangled photons through said second mirror, the entangled photons exiting the cavity via the optical element for spatially separating the light frequencies can be back reflected into the optical cavity by an additional mirror that is highly reflective for frequencies around f.

3. An apparatus according to claim 1, wherein said optical cavity element is pumped externally with a laser or classical light source at frequency f through a mirror of the optical cavity with a high transmittance at frequency f or is reflected into the cavity by an intracavity optical element that is highly reflective for frequency f and highly transmissive for frequency 2f.

4. An apparatus according to claim 1, further comprising an optical element, placed between the laser medium and the medium for second harmonic generation, which separates the 2f and the f light frequency into different directions, wherein said laser medium and optical element are contained within said optical cavity element.

5. An apparatus according to claim 1 further comprising a medium for entangled photon generation emitting entangled photons non-colinearly with respect to the laser light at the frequency 2f.

6. An apparatus according to claim 5, wherein the entangled photons are coupled out of the cavity through a cavity mirror with a high transmittance for frequencies around f or by an optical element placed inside the optical cavity that spatially directs the light of frequencies around f out of the cavity.

7. An apparatus according to claim 1, wherein the pump light source is a pulsed light source.

8. An apparatus according to claim 1, wherein the pump light source is a continuous light source.

9. An apparatus according to claim 1, wherein dichroic and/or polarization-sensitive optics are used in optical cavities.

10. An apparatus according to claim 1, wherein optical fibers or waveguides are used for the transport and/or processing of light.

11. An apparatus according to claim 1, wherein the medium for entangled photon generation is a nonlinear optical crystal.

12. An apparatus according to claim 1, wherein the medium for entangled photon generation is a parametric downconversion crystal (PDC).

13. An apparatus according to claim 1, wherein the medium for entangled photon generation is a poled nonlinear medium.

14. An apparatus according to claim 1, wherein the parametric process, or set of simultaneous parametric processes, are of type-I, type-II, or any combination thereof.

15. An apparatus according to claim 1, wherein the parametric process, or set of simultaneous parametric processes, are used to generate the entangled photons degenerately at frequencies around f.

16. An apparatus according to claim 1, wherein the parametric process, or set of simultaneous parametric processes, are used to generate the entangled photons non-degenerately at frequencies around f.

17. An apparatus according to claim 1, wherein dichroic mirrors are used which have high reflectance (HR) and/or high transmittance (HT) at or around f and/or at 2f.

18. An apparatus according to claim 1, with at least one optical element for angularly separation different light frequencies.

* * * * *